United States Patent
Woo et al.

(10) Patent No.: US 9,992,140 B2
(45) Date of Patent: Jun. 5, 2018

(54) ELECTRONIC APPARATUS, SERVER, AND CONTROL METHOD OF SYSTEM

(71) Applicant: Samsung Electronics Co. Ltd., Suwon-si, Gyeonggi-do (KR)

(72) Inventors: Hong-uk Woo, Seoul (KR); Ran-kyung Hong, Seoul (KR); Hong-soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 13/919,150

(22) Filed: Jun. 17, 2013

(65) Prior Publication Data
US 2014/0101270 A1 Apr. 10, 2014

(30) Foreign Application Priority Data
Oct. 8, 2012 (KR) .................. 10-2012-0111544

(51) Int. Cl.
| | |
|---|---|
| G06F 15/16 | (2006.01) |
| H04L 12/58 | (2006.01) |
| H04W 88/04 | (2009.01) |
| H04L 29/08 | (2006.01) |
| H04W 84/20 | (2009.01) |

(52) U.S. Cl.
CPC .............. *H04L 51/04* (2013.01); *H04L 51/14* (2013.01); *H04L 67/26* (2013.01); *H04W 88/04* (2013.01); *H04W 84/20* (2013.01)

(58) Field of Classification Search
CPC ......... H04L 51/04; H04L 67/26; H04L 51/14; H04W 84/20; H04W 88/04
See application file for complete search history.

(56) References Cited

U.S. PATENT DOCUMENTS

| | | | |
|---|---|---|---|
| 8,064,896 B2 | 11/2011 | Bell et al. | |
| 8,260,873 B1* | 9/2012 | Kandekar et al. | 709/209 |
| 2002/0129095 A1* | 9/2002 | Hatalkar | H04L 12/185 |
| | | | 709/203 |

(Continued)

FOREIGN PATENT DOCUMENTS

| | | |
|---|---|---|
| JP | 2010-178193 A | 8/2010 |
| KR | 10-2008-0065230 A | 7/2008 |

OTHER PUBLICATIONS

Paul Krzyzanowski, Group Communication, CS 417: Distributed Systems, Rutgers University, pp. 1-7, Aug. 23, 2010.

*Primary Examiner* — Brian J Gillis
*Assistant Examiner* — Austin Moreau
(74) *Attorney, Agent, or Firm* — Jefferson IP Law, LLP

(57) ABSTRACT

An electronic apparatus connected to a server providing real-time messaging through a messaging channel to communicate therewith is provided. The apparatus includes a client communication unit for communicating with the server and at least one external device, the electronic apparatus and the at least one external device forming a client group, and a client controller for classifying the electronic apparatus and the at least one external device in the client group into a header client connected with the messaging channel to the server and a node client, and for controlling the header client to transmit a message about the node client from the server to the node client when the message from the server is transmitted to the header client through the messaging channel.

19 Claims, 7 Drawing Sheets

(56) References Cited

U.S. PATENT DOCUMENTS

| | | | |
|---|---|---|---|
| 2003/0195019 A1* | 10/2003 | Litwin | 455/574 |
| 2006/0235972 A1 | 10/2006 | Asnis | |
| 2009/0061825 A1* | 3/2009 | Neelakantan | H04L 29/12292 455/412.1 |
| 2009/0316625 A1 | 12/2009 | Chen et al. | |
| 2010/0112536 A1* | 5/2010 | Claassen et al. | 434/258 |
| 2012/0066067 A1* | 3/2012 | Curtis et al. | 705/14.58 |
| 2012/0143978 A1* | 6/2012 | Coussemaeker et al. | 709/208 |
| 2012/0151006 A1* | 6/2012 | McInerney et al. | 709/219 |
| 2012/0271902 A1* | 10/2012 | Baliga | H04L 43/0811 709/209 |
| 2013/0054743 A1* | 2/2013 | Feher | H04L 65/4076 709/217 |
| 2013/0337860 A1* | 12/2013 | Xu | H04L 67/26 455/518 |
| 2014/0007213 A1* | 1/2014 | Sanin et al. | 726/9 |

* cited by examiner

ELECTRONIC APPARATUS, SERVER, AND
CONTROL METHOD OF SYSTEM

PRIORITY

This application claims the benefit under 35 U.S.C. § 119(a) of a Korean patent application filed on Oct. 8, 2012 in the Korean Intellectual Property Office and assigned Serial No. 10-2012-0111544, the entire disclosure of which is hereby incorporated by reference.

BACKGROUND OF THE INVENTION

1. Field of the Invention

The present invention relates to an electronic apparatus capable of installing and using various applications, a server, and a control method of a system. More particularly, the present invention relates to an electronic apparatus having a structure of providing a messaging service in which a server transmits a message about an application in real time to an electronic apparatus in which the application is installed, a server, and a control method of a system.

2. Description of the Related Art

An electronic apparatus is one of a variety of devices controlling transfer of electrons by energy, such as electricity, to perform a variety of user desired functions. For example, various types and characteristics of electronic apparatuses include home appliances (such as a washing machine, a refrigerator and a dish washer), Audio/Video (A/V) devices (such as a set-top box, an optical media reproduction system and a television (TV)), and mobile devices (such as a Personal Computer (PC), a mobile phone and a portable media player) are used at home to meet demands of a user.

In accordance with technological advancement and increasing user demand, such electronic apparatuses install and activate applications performing a variety of functions. An electronic apparatus is typically connected to a server to communicate therewith through a network. Applications support diverse types of messages, such as advertisements, updates, and notifications. The server provides a message about an application in real time to an electronic apparatus in which the application is installed, and the electronic apparatus notifies a user of the message, for example, by displaying the message received from the server. A real-time messaging service from a server is referred to as push notification, and a server providing a message to an electronic apparatus as a client is referred to as a push server.

Since a push notification has a network structure in which the push server provides a messaging service to each client in real time, the push server has a great system load and a large amount of communication traffic from the push server. Thus, a network resource may be more efficiently distributed if the system load and communication traffic of the push server are reduced.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an electronic apparatus capable of installing and using various applications, a server, and a control method of a system.

In accordance with an aspect of the present invention, an electronic apparatus connected to a server providing real-time messaging through a messaging channel to communicate therewith is provided. The electronic apparatus includes a client communication unit for communicating with the server and at least one external device, the electronic apparatus and the at least one external device forming client group, and a client controller for classifying the electronic apparatus and the at least one external device in the client group into a header client connected with the messaging channel to the server and a node client, and for controlling the header client to transmit a message about the node client from the server to the node client when the message from the server is transmitted to the header client through the messaging channel.

In accordance with another aspect of the present invention, the electronic apparatus may further include a user input unit, wherein the client controller may select any one device in the client group selected by the user input unit as the header client.

In accordance with another aspect of the present invention, the client controller may collect battery residual value information from each of the electronic apparatus and the at least one external device in the client group, and may select one device in the client group having the highest battery residual value as the header client.

In accordance with another aspect of the present invention, the client controller may determine network availability of each of the electronic apparatus and the at least one external device in the client group, and may select one device in the client group as the header client based on frequency in use of a network.

In accordance with another aspect of the present invention, the client controller may select one device in the client group having a record of a header client as the header client.

In accordance with another aspect of the present invention, the message from the server may be transmitted from an application server providing an application to the server, and the electronic apparatus or the external device may be able to receive the message when the application is installed.

In accordance with another aspect of the present invention, the client controller may maintain a messaging channel with the header client and block a messaging channel with the node client if the header client is selected while each of the electronic apparatus and the at least one external device in the client group is connected to the server through the messaging channel.

In accordance with another aspect of the present invention, the client controller may control the header client to temporarily store the message in the electronic apparatus when the node client is offline while the header client receives the message about the node client, and controls the header client to transmit the temporarily stored message to the node client when the node client is reconnected.

In accordance with another aspect of the present invention, the client controller may select a new header client when the existing header client in the client group is offline with respect to the server or a new external device in the client group is connected for communication.

In accordance with another aspect of the present invention, a server providing real-time messaging to a client through a messaging channel is provided. The server includes a server communication unit for communicating with the client, and a server controller for controlling a header client to transmit a message about a node client to the node client by transmitting the message to the header client, if the message is received, wherein at least two clients in a client group are classified into the header client and at least one of the node client, the header client being connected to the server communication unit through the messaging channel.

In accordance with another aspect of the present invention, the server controller may determine the header client in the client group based on information about selection of the header client when the information is received from any one client in the client group.

In accordance with another aspect of the present invention, the server controller may maintain a messaging channel with the header client and block a messaging channel with the node client when the header client is identified while the messaging channels with the respective clients in the client group are connected.

In accordance with another aspect of the present invention, the server communication unit may be connected to an application server providing an application, and the server controller may transmit the message received from the application server to the header client.

In accordance with another aspect of the present invention, a control method of a system providing real-time messaging from a server to a client through a messaging channel is provided. The control method includes setting at least one client group including at least two clients from a plurality of clients, classifying the clients in the client group into a header client connected with the messaging channel to the server and at least one node client other than the header client and selecting the header client, transmitting a message from the server to the header client through the messaging channel when the message is to be transmitted from the server to the node client, and transmitting the message received from the server from the header client to the node client.

In accordance with another aspect of the present invention, the selecting of the header client may include selecting any one client in the client group selected by a user as the header client.

In accordance with another aspect of the present invention, the selecting of the header client may include collecting battery residual value information from each of the clients in the client group and selecting one of the clients in the client group having the highest battery residual value of the client group as the header client.

In accordance with another aspect of the present invention, the selecting of the header client may include determining network availability of each of the clients in the client group and selecting one of the clients in the client group as the header client based on frequency in use of a network.

In accordance with another aspect of the present invention, the selecting of the header client may include determining whether the clients in the client group have a record of a header client and selecting one of the clients in the client group having a record of a header client as the header client.

In accordance with another aspect of the present invention, the message from the server may be transmitted from an application server providing an application to the server, and the clients may be able to receive the message when the application is installed.

In accordance with another aspect of the present invention, the selecting of the header client may include maintaining a messaging channel with the header client and blocking a messaging channel with the node client when the header client is selected while each of the clients in the client group is connected to the server using the messaging channel.

In accordance with another aspect of the present invention, the transmitting of the message from the header client to the node client may include temporarily storing the message in the header client when the node client is offline and transmitting the temporarily stored message to the node client when the node client is reconnected.

In accordance with another aspect of the present invention, the selecting of the header client may include selecting a new header client when the existing header client in the client group is offline with respect to the server or a new external device in the client group is connected for communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
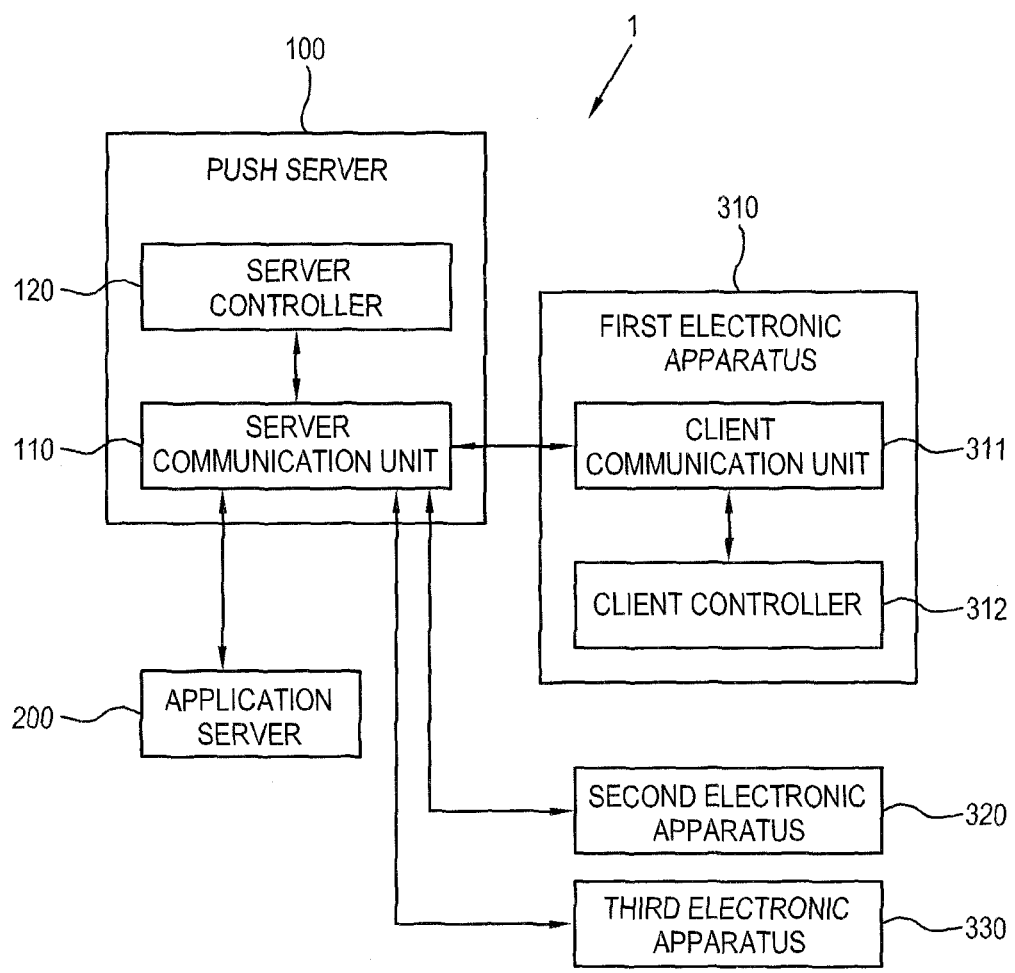
FIG. 1 is a block diagram illustrating a configuration of a network system according to an exemplary embodiment of the present invention.

FIG. 1 is a block diagram illustrating a configuration of a network system according to an exemplary embodiment of the present invention.

Referring to FIG. 1, the system 1 in accordance with a push notification network architecture includes an application server 200 providing various applications, a push server 100 connected to the application server 200 and providing a push notification service, and one or more electronic apparatuses 310, 320, and 330 as a client connected to the push server 100 and receiving the push notification service provided by the push server 100.

The push server 100 includes a server communication unit 110 connected to the application server 200 and the respective electronic apparatuses 310, 320, and 330 to communicate therewith and a server controller 120 controlling general operations of the push server 100. The server communication unit 110 is connected to a network in accordance with a wired/wireless communication protocol. The network is also connected to the application server 200 or the electronic apparatuses 310, 320, and 330.

The electronic apparatuses 310, 320, and 330 may include any general electronic device, for example, home appliances (such as a washing machine, a refrigerator and a dish washer), audio/video devices (such as a set-top box, an optical media reproduction system and a television (TV)), and mobile devices (such as a Personal Computer (PC), a mobile phone and a portable media player. However, these are merely examples; exemplary embodiments of the present invention may be any type of electronic device.

The first electronic apparatus 310 includes a client communication unit 311 connected to the push server 100 and a client controller 312 controlling general operations of the first electronic apparatus 310. The client communication unit 311 is connected not only to the push server 100 but also to the application server 200 or a second electronic apparatus 320 to communicate therewith. The first electronic apparatus 310 may include a display unit (not shown) to display an image and a user input unit (not shown) manipulated by a user based on a configuration thereof. The second electronic apparatus 320 and a third electronic apparatus 330 are configured in the same manner as the first electronic apparatus 310.

While FIG. 1 shows one application server 200 and three electronic apparatuses 310, 320, and 330, it should be noted that any number of the application servers 200 and the electronic apparatuses 310, 320, and 330 may be connected to the push server 100.

With this configuration, the push notification service provided to the respective electronic apparatuses 310, 320, and 330 is a service which transmits a message based on an application to the electronic apparatuses 310, 320, and 330 as clients in real time, thereby notifying the user of details of the message received by the electronic apparatuses 310, 320, and 330.

An application providing the application server 200 may be installed in the electronic apparatuses 310, 320, and 330 for use. There is no particular restriction as to kinds and content of applications.

The application server 200 transmits a message and target information about an electronic apparatus 310, 320, or 330 to receive the message to the push server 100. The target information about the electronic apparatus 310, 320, or 330 may be information about an account of the electronic apparatus 310, 320, or 330 or information about an address of the electronic apparatus 310, 320, or 330. A target apparatus to which the message is transmitted among the electronic apparatuses 310, 320, and 330 includes an electronic apparatus 310, 320, or 330 in which an application associated with the message is installed.

The push server 100 transmits the message received from the application server 200 to the target apparatus 310, 320, or 330 among the electronic apparatuses 310, 320, and 330 in which the application is installed. The electronic apparatuses 310, 320, and 330 notify the user of the details of the message by various methods, such as by displaying the message as an image or using a sound. The electronic apparatuses 310, 320, and 330 may provide a supplementary functionality, for example, automatically activating the application corresponding to the received message upon receiving the message.

The push server 100 has a separate messaging channel or push channel for transmitting the message to the electronic apparatuses 310, 320, and 330 connected for communication. The push channel is used only to transmit a message in accordance with the push notification service (i.e., a push message), and does not transmit the push message to the electronic apparatuses 310, 320, and 330 without the push channel established/connected even though the electronic apparatuses 310, 320, and 330 are connected for communication.

For example, suppose that among the first to third electronic apparatuses 310, 320, and 330 connected to the push server 100 for communication, push channels are established with the first electronic apparatus 310 and the second electronic apparatus 320 and there is no push channel established with the third electronic apparatus 330. In addition, an application is installed in each of the first to third electronic apparatuses 310, 320, and 330.

In this initial state, when the application server 200 transmits a push message about the application to the push server 100, the push server 100 can transmit the push message to the first electronic apparatus 310 and the second electronic apparatus 320 but cannot transmit the push message to the third electronic apparatus 330.

These push channels have a persistent TCP connection to provide the push message in real time. When the push server 100 transmits the push message to the first electronic apparatus 310, system power of the first electronic apparatus 310 may be turned off or the first electronic apparatus 310 may be disconnected from communication, and thus the push message may not be immediately transmitted to the first electronic apparatus 310. In this case, the push server 100 supports a store and forward mode, in which the push message is temporarily stored in the push server 100 and then is transmitted to the first electronic apparatus 310 when the first electronic apparatus 310 is reconnected.

Figure 2:
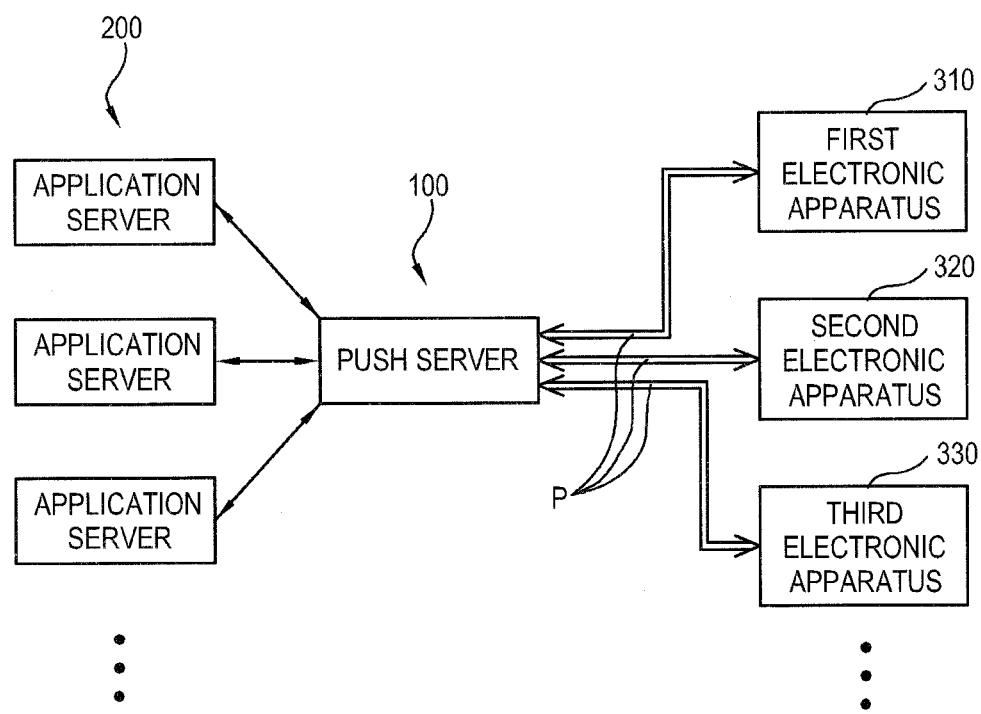
FIG. 2 is a block diagram illustrating a general push message transfer system of a system in accordance with a push notification network architecture according to an exemplary embodiment of the present invention.

FIG. 2 is a block diagram illustrating a general push message transfer system of a network system in accordance with a push notification network architecture according to an exemplary embodiment of the present invention.

Referring to FIG. 2, at least one application server 200 is connected to the push server 100, and the electronic apparatuses 310, 320, and 330 are also connected to the push server 100. Push channels P are connected between the respective electronic apparatuses 310, 320, and 330 and the push server 100, so that the electronic apparatuses 310, 320, and 330 may receive a push message from the push server 100 through the push channels P. The push server 100 establishes the push channels P with the respective electronic apparatuses 310, 320, and 330.

However, such a system may involve various problems.

First, a network load of the push server 100 maintaining the push channels P with the respective electronic apparatuses 310, 320, and 330 increases. The push channels P use persistent TCP connection to guarantee real-time transfer. Further, as more electronic apparatuses 310, 320, and 330 are provided with a push notification service, the push server 100 consumes a greater amount of resources, such as a load of the server controller 120 or a network bandwidth. When the push server 100 operates a large-scale push platform, problems may occur in a transfer success rate and real-time transfer of the push message depending on capability of the push server 100. For example, the push message may be deleted in the push server 100 before the push message is successively transferred, and the application server 200 or the electronic apparatuses 310, 320, and 330 may not recognize such deletion of the push message.

Second, a load of the push server 100 increases due to the store and forward mode. As described above, when an electronic apparatus 310, 320, or 330 to receive the push message is offline, the push message is temporarily stored in the push server 100 first. An increase in the number of temporarily stored messages affects an amount of needed database resources of the push server 100. For example, in a large-scale push platform, a limited amount of push messages may be temporarily stored in the push server 100. In this case, push messages exceeding the limit may be deleted from the push server 100.

Third, the electronic apparatuses 310, 320, and 330 as clients maintain the push channels P, thereby reducing efficiency of client resources. When the electronic apparatuses 310, 320, and 330 are mobile devices, a battery-related issue is always a major concern. Maintaining the push channels P all the time may affect an amount of the battery consumed. To maintain the push channels P, resources are continuously consumed regardless of whether the push message is actually transmitted.

Fourth, redundant push messages are generated based on an application-based service, thus reducing operation efficiency of the network. A push message is generated in accordance with an application and transmitted to an electronic apparatus 310, 320, or 330 having the application installed. It is an increasing trend that as the user uses a plurality of electronic apparatuses 310, 320, and 330 at the same time and thus installs a communal application in the respective electronic apparatuses 310, 320, and 330, a single push message is redundantly transmitted to the plurality of electronic apparatuses 310, 320, and 330.

Fifth, a restriction on standards of the electronic apparatuses 310, 320, and 330 in accordance with a standard of the push server 100 may be an issue. Since only an electronic apparatus 310, 320, or 330 capable of maintaining the push channels P to the push server 100 is provided with the push notification service, home electronics that do not enable access to the Internet and support local home networking only may not be provided with a push message.

Considering the foregoing problems, a method/structure according to an exemplary embodiment of the present invention is suggested as follows.

Figure 3:
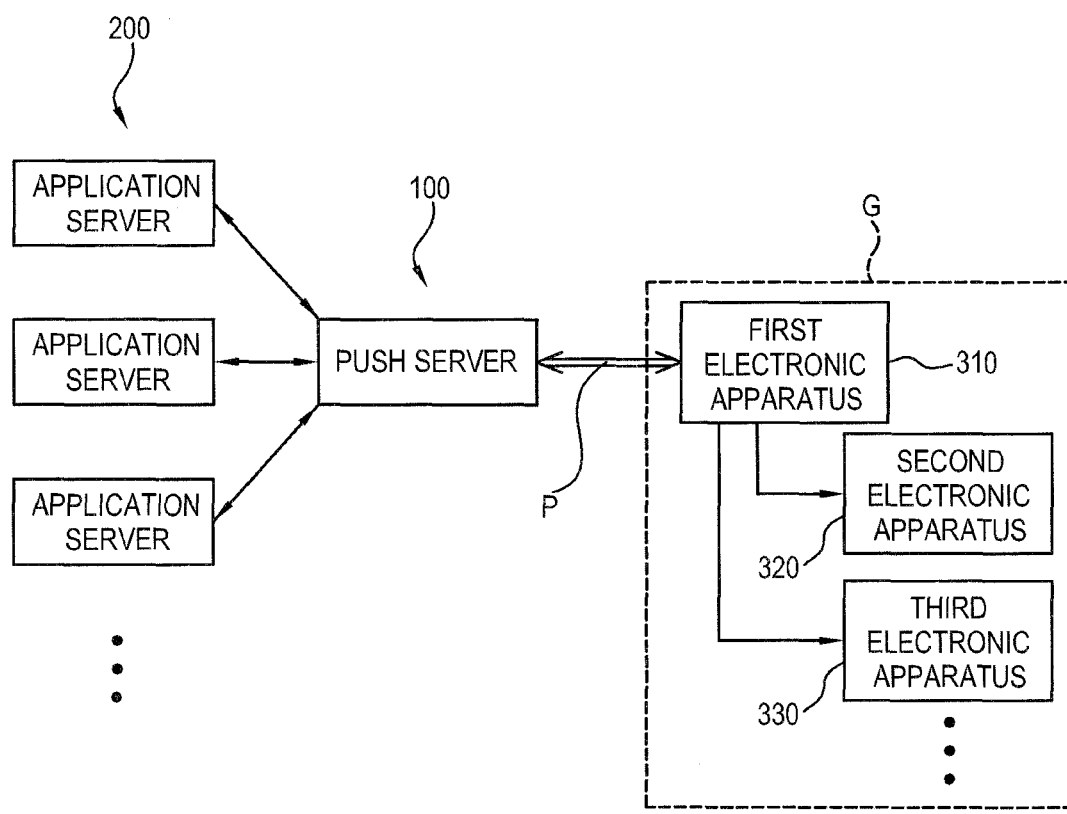
FIG. 3 is a block diagram illustrating a push message transfer system of a system in accordance with a push notification network architecture according to an exemplary embodiment of the present invention.

FIG. 3 is a block diagram illustrating a push message transfer system of a system in accordance with a push notification network architecture according to an exemplary embodiment of the present invention.

Referring to FIG. 3, a client group G including a plurality of electronic apparatuses 310, 320, and 330 is set first. The client group G may be set by the push server 100 or any one of the electronic apparatuses 310, 320, and 330, and one or more client groups G may be set.

Any one of the electronic apparatuses 310, 320, and 330 selects a header client among the electronic apparatuses 310, 320, and 330 in the client group G based on a preset condition and defines the other apparatuses as node clients. In FIG. 1, the header client is the electronic apparatus 310, and the node clients are the remaining electronic apparatuses 320 and 330. The terms header client and node client are provided only for convenience to distinguish the clients.

The push server 100 maintains a push channel P only with the header client 310 among the plurality of electronic apparatus 310, 320, and 330 in the client group G. When a push message for the electronic apparatuses 320 and 330 in the client group G is received from an application server 200, the push server 100 transmits the message to the header client 310 through the push channel P.

The header client 310 transmits the message received from the push server 100 to the electronic apparatuses 320 and 330 in the client group G. When the electronic apparatuses 320 and 330 are offline, the header client 310 temporarily stores the push message in the header client 310, and then transmits the message when the electronic apparatuses 320 and 330 are reconnected.

With this configuration, the push server 100 maintains only the push channel P with the header client 310 in the client group G, instead of maintaining push channels P with the respective electronic apparatuses 310, 320, and 330. Thus, a load for maintaining the push channels P decreases, thereby reducing a network load of the push server 100.

Further, when the push message is transmitted to the electronic apparatuses 320 and 330 which are offline, the push message is temporarily stored in each client group G, instead of in the push server 100. A distributed store and forward mode is enabled, thus reducing a load of the push server 100 storing and managing the push message.

In addition, since only the header client 310 in the client group G maintains the push channel P, without all of the electronic apparatuses 310, 320, and 330 necessarily maintaining the push channels, the electronic apparatuses 310, 320, and 330 having a battery problem, such as a mobile device, may improve usability of the battery. Communication connection between header client 310 and the node clients 320 and 330 in the client group G is established only when transmission of the push message is needed in a Local Area Network (LAN) environment, not causing a load of persistent TCP connection.

Moreover, one push message is transmitted to the client group G, not to the individual electronic apparatuses 310, 320, and 330, and then transmitted to the respective electronic apparatuses 310, 320, and 330 in the client group G, thereby preventing transmission of redundant push messages through the push channel P. Transmission of a push message within the client group G may be limited by a user's intention depending on how the user uses the respective electronic apparatuses 310, 320, and 330.

In addition, a protocol of the push channel limited by the push server 100 has a standard restriction, for example, that the protocol secures TCP connection on the Internet, while standards of the electronic apparatuses 310, 320, and 330 in the client group G may be defined as various modes of allowing messaging in the client group G.

A case where the user actually uses the system 1 in accordance with the foregoing configuration is described below.

Suppose that the user stays in an office or at home, always carries a mobile phone and a tablet PC, has a notebook computer and an Internet phone in the office, and has a desktop computer, a TV, and a refrigerator at home. An application providing a push notification service is installed in all of the aforementioned electronic apparatuses, and the user adjusts a setting to receive a push message in a process of installing the application in the respective electronic apparatuses.

In this use environment, in a general case illustrated with reference to FIG. 2, all of the electronic apparatuses maintain connection to the push server 100 through push channels P. However, according to an exemplary embodiment of the present invention, the respective electronic apparatuses in a client group G dynamically divide up roles.

When the user stays in the office, the notebook computer is set as the header client 310 of the client group G. The notebook computer identifies the push message received from the push server 100 and transmits the message to the mobile phone and the tablet PC.

While the user is on the road, the tablet carried with the user is set as the header client 310 of the client group G and identifies the push message.

When the user is at home, the refrigerator may be set as the header client 310. When the user is watching TV, the TV is set as the header client 310 and identifies the push message.

In this way, according to an exemplary embodiment of the present invention, the user may be conveniently provided with the push notification service.

A process in which the system 1 forms a push notification network architecture and provides a service according an exemplary embodiment is described below with reference to FIGS. 4 and 5.

Figure 4:
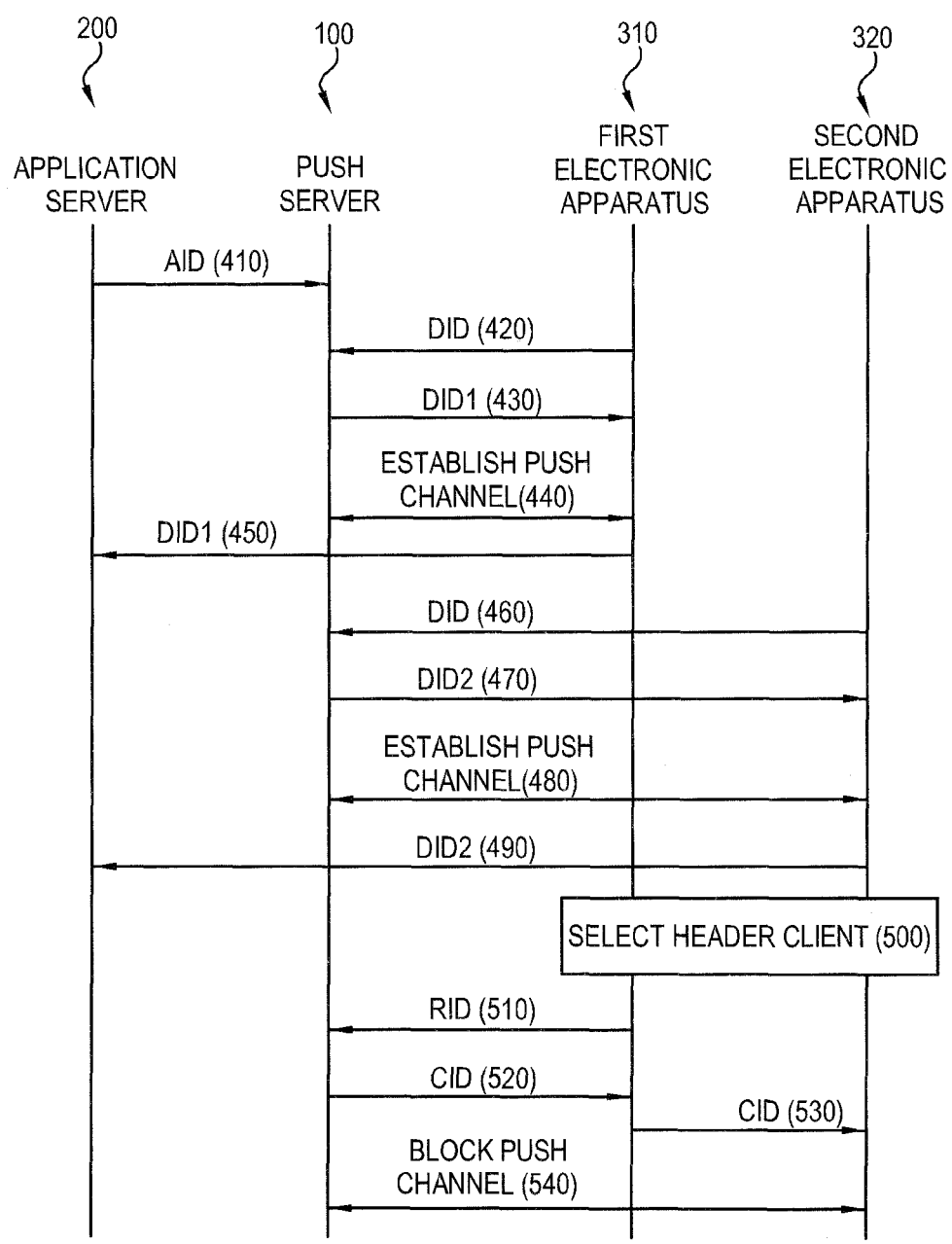
FIG. 4 illustrates signal transmission in a session establishment stage according to an exemplary embodiment of the present invention.
Figure 5:
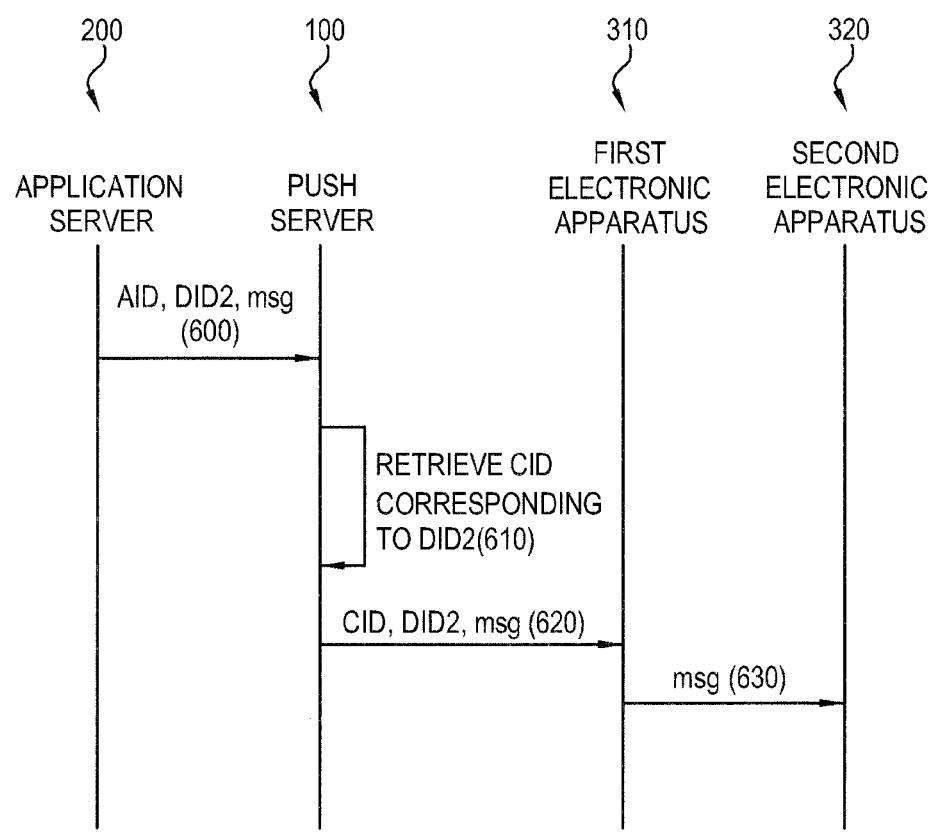
FIG. 5 illustrates signal transmission in a messaging stage of a system according to an exemplary embodiment of the present invention.

FIG. 4 illustrates signal transmission in a session establishment stage of a system according to an exemplary embodiment of the present invention, and FIG. 5 illustrates signal transmission in a messaging stage of a system 1 according to an exemplary embodiment of the present invention.

Referring to FIG. 4, a session establishment stage is a process in which the system 1 classifies clients to select a header client and a node client in a client group and organizes a push channel, and a messaging stage is a process in which a push notification service is provided after completion of the session establishment stage.

Although FIG. 4 illustrates an example with only two clients, a first electronic apparatus 310 and a second electronic apparatus 320, exemplary embodiments of the present invention may be also applied to three or more clients.

The application server 200 transmits an Application Identification (AID) to the push server 100 to register a target application to which a push notification service is provided in the push server 100 in step 410.

IDs to be used in the system 1 are defined as follows:

An AID denotes an ID to distinguish an application.

A device ID denotes an ID to distinguish each electronic device 310, 320, or 330.

A cluster ID denotes an ID for the push server 100 to distinguish each client group.

A Role ID (RID) denotes an identifier to distinguish a header client and a node client in a client group.

In addition, a certificate needed for each electronic apparatus 310, 320, or 330 to communicate with the push server 100 or a certificate needed for the application server 200 to communicate with the push server 100 may be used.

The first electronic apparatus 310 registers its own DID in the push server 100 and requests establishment of a push channel in step 420. The push server 100 identifies the DID received from the first electronic apparatus 310 as a DID1 that is a unique ID to distinguish the first electronic apparatus 310 in step 430 and establishes a push channel with the first electronic apparatus 310 in step 440. The first electronic apparatus 310 transmits the DID1 to the application server 200 in step 450 so that the application server 200 distinguishes the first electronic apparatus 310.

Similarly, the second electronic apparatus 320 registers its own DID in the push server 100 and requests establishment of a push channel in step 460. The push server 100 identifies the DID received from the second electronic apparatus 320 as a DID2 that is a unique ID to distinguish the second electronic apparatus 320 in step 470 and establishes a push channel with the second electronic apparatus 320 in step 480. The second electronic apparatus 320 transmits the DID2 to the application server 200 in step 490.

When the push channels with respect to the respective electronic apparatuses 310 and 320 in the client group are established, a header client of the client group is selected based on a preset condition in step 500. A method of selecting a header client from the client group is described below.

In the example shown in FIG. 4, the first electronic apparatus 310 is selected as a header client.

The first electronic apparatus 310 transmits RIDs of the electronic apparatuses 310 and 320 in the client group to the push server 100 in step 510.

The push server 100 determines that the first electronic apparatus 310 is a header client and the second electronic apparatus 320 is a node client through the RIDs and stores a determination result.

The push server 100 transmits a CID to distinguish the client group to the first electronic apparatus 310 in step 520. The first electronic apparatus 310 transmits the CID to the second electronic apparatus 320 in step 530. Accordingly, the electronic apparatuses 310 and 320 in the client group store the CID to identify the electronic apparatuses 310 and 320 as belonging to the same client group.

The push server 100 blocks the push channel with the second electronic apparatus 320 in step 540. Thus, the push server 100 maintains only the push channel with the first electronic apparatus 310 as the header client.

Referring to FIG. 5, a messaging stage is described as follows.

To transmit a message about a particular application to the second electronic apparatus 320, the application server 200 transmits an AID of the application, the DID2 to distinguish the second electronic apparatus 320, and data including content of the message that is received at the push server 100 in step 600.

The push server 100 retrieves a CID corresponding to the DID2 in step 610. The push server 100 transmits the CID, the DID2, and message through a push channel of the retrieved CID. This transmitted information is transmitted to the first electronic apparatus 310 in step 620 as the header client in the client group corresponding to the CID.

The first electronic apparatus 310 transmits a message to the second electronic apparatus 320 corresponding to the DID2 in step 630.

In this manner, the push notification service is provided.

A method of selecting a header client in a client group is described below.

Selecting a header client of any one client group is carried out when there is a change in the client group. For example, a new client may be added or a header client may be offline. When any one client in the client group detects such a change, a header client selection process may be started.

A subject of selecting the header client may be any client in the client group. For example, when a new client is added, the header client may perform the selection process. When the header client is offline, any one node of the client group may conduct the selection process.

Figure 6:
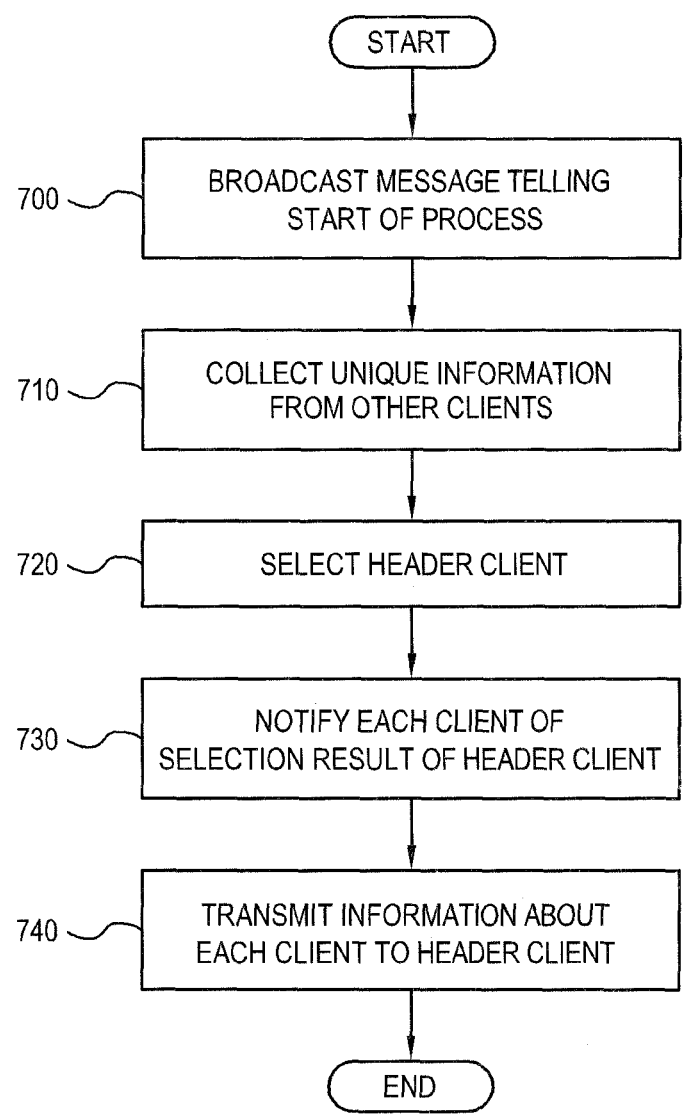
FIGS. 6 and 7 are flowcharts illustrating a process of selecting a header client of a client group according to an exemplary embodiment of the present invention.
Figure 7:
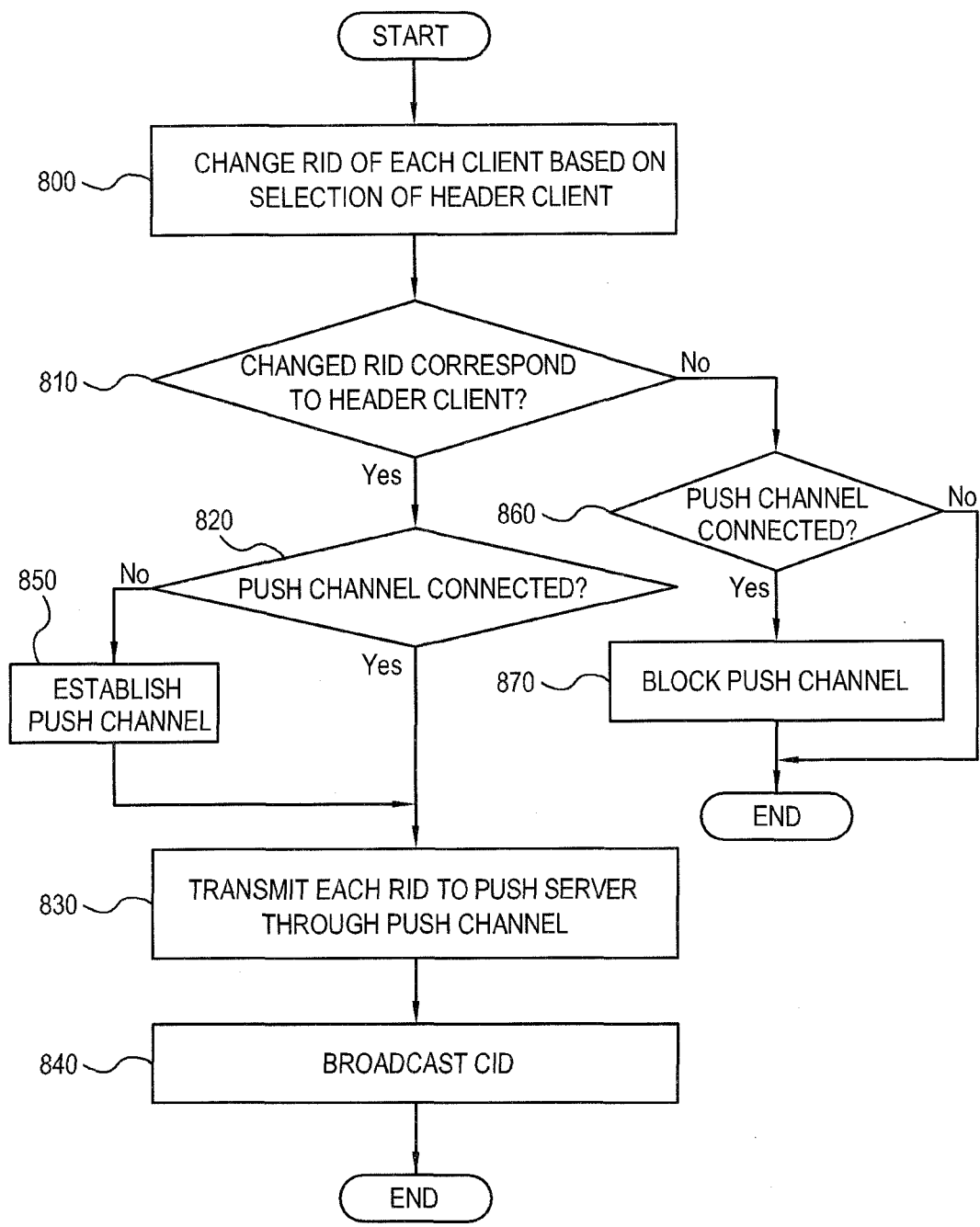

FIGS. 6 and 7 are flowcharts illustrating a process of selecting a header client of a client group according to an exemplary embodiment of the present invention.

Referring to FIG. 6, when a process of selecting a header client is started, any one client ("first client") in a client group broadcasts a message telling the start of the process to other clients in step 700. The first client collects unique information, for example, a DID, a CID, an RID, network availability, and battery residual amount, from the clients in step 710.

The first client selects a header client of the client group based on the collected unique information and a preset condition in step 720. The first client may select itself as a header client when the first client satisfies the selecting conditions.

The conditions for selecting a header client may be modified variously. For example, the first client may select a client selected by a user through a user input unit (not shown) as a header client. Alternatively, the first client may select any client having a higher battery residual value of the client group as a header client based on information about battery residual values collected from the clients.

The first client may determine network availability of each client, for example, frequency in use of a network or a traffic level of the network, and select any one client with a higher frequency or lower frequency in the use of the network in the client group as a header client.

In addition, the first client may identify a record of a header client of each client and select any one client having a record of a header client as a header client.

The first client selects any one client as a header client and notifies the clients of the client selected as the header client in step 730. The first client transmits the information collected from the clients to the header client in step 740.

Referring to FIG. 7, an RID of each client in the client group is changed according to the notification of the first client in step 800.

Each client determines whether the changed RID represents the header client in step 810.

When the changed RID represents the header client, the relevant client determines whether a push channel is connected in step 820. When the push channel is connected, the client transmits the RID of each client to a push server through the push channel in step 830 and broadcasts a CID received from the push server in step 840. When the push channel is not connected, the client establishes a push channel in step 850 and transmits the RID of each client to the push server through the push channel.

When the changed RID represents a node client, the relevant client determines whether a push channel is connected in step 860. When the push channel is connected, the client requests blocking the push channel from the push server in step 870. When the push channel is not connected, the client takes no action.

In this manner, the header client may be selected from the client group.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic apparatus connected to a server providing real-time messaging through a messaging channel and to at least one other electronic apparatus, the electronic apparatus comprising:
   a client transceiver configured to communicate with the server and the at least one other electronic apparatus, wherein the electronic apparatus and the at least one other electronic apparatus form a client group;
   a client processor; and
   a client memory storing instructions, which when executed by the client processor, cause the client processor to:
      recognize the electronic apparatus either as a header client or as a node client through communication within the client group including the at least one other electronic apparatus, wherein one electronic apparatus among the client group broadcasts a message indicating a start of a process of selecting the header client to other electronic apparatuses among the client group, receiving unique information from the other electronic apparatuses, and selecting the electronic apparatus as the header client based on the unique information,
      select one of the electronic apparatus and the at least one other electronic apparatus as the header client based on one of a frequency in use of a network or whether one of the electronic apparatus and the at least one other electronic apparatus has a record of the header client,
      in response to the electronic apparatus being recognized as the header client,
      establish a push channel with the server,
      transmit role information indicating that the electronic apparatus is the header client and the at least one other electronic apparatus is the at least one node client to the server,
      receive cluster identification information from the server which assigns the cluster identification information indicating that the electronic apparatus and the at least one other electronic apparatus are clustered within the client group, and
      control the client transceiver to transmit a message destined to the at least one node client to the at least one node client when the message is received from the server, the at least one node client being clustered with the header client within the client group indicated by the cluster identification information, and
      in response to the electronic apparatus being recognized as the node client, while a push channel is not established between the node client and the server, receive from a header client, which is selected from among the client group, a message destined to the electronic apparatus, wherein the client processor temporarily stores the message in the header client when the node client is offline while the header client receives the message about the node client, and controls the header client to transmit the temporarily stored message to the node client when the node client is reconnected.

2. The electronic apparatus of claim 1, further comprising:
a user input interface,
wherein the client processor is further configured to select the electronic apparatus as the header client by the user input interface.

3. The electronic apparatus of claim 1, wherein the client processor is further configured to:
collect battery residual value information from each of the electronic apparatus and the at least one other electronic apparatus in the client group, and
select one of the electronic apparatus and the at least one other electronic apparatus in the client group having the highest battery residual value as the header client.

4. The electronic apparatus of claim 1, wherein the client processor is further configured to:
determine network availability of each of the electronic apparatus and the at least one other electronic apparatus in the client group.

5. The electronic apparatus of claim 1,
wherein the message from the server is transmitted from an application server providing an application to the server, and
wherein the electronic apparatus or the at least one other electronic apparatus is able to receive the message when the application is installed.

6. The electronic apparatus of claim 1, wherein the client processor is further configured to:
maintain a messaging channel with the header client, and
block a messaging channel with the node client if the header client is selected while each of the electronic apparatus and the at least one other electronic apparatus in the client group is connected to the server through the messaging channel.

7. The electronic apparatus of claim 1, wherein the client processor is further configured to select a new header client when the existing header client in the client group is offline with respect to the server or a new external electronic apparatus in the client group is connected for communication.

8. A server providing real-time messaging to a client group through a messaging channel, the client group comprising an electronic apparatus and at least one other electronic apparatus, the server comprising:
a server transceiver configured to communicate with the client group through the messaging channel;
a server processor; and
a server memory storing instructions which when executed by the server processor cause the server processor to:
receive information indicating that the electronic apparatus is a header client and the at least one other electronic apparatus is at least one node client among the client group,
establish a push channel with the header client,
transmit cluster identification information indicating that the electronic apparatus and the at least one other electronic apparatus are clustered within the client group,
control the server transceiver to transmit a message to the header client through the message channel, and
when the message is destined for the at least one node client, use the cluster identification information and transmit the message to the header client for distribution to the at least one node client,
wherein one electronic apparatus among the client group, other than the header client, broadcasts a message indicating a start of a process of selecting the header client to other electronic apparatuses among the client group, receiving unique information from the other electronic apparatuses, and selecting the electronic apparatus as the header client based on the unique information,
wherein the message is temporarily stored in the header client when the node client is offline while the header client receives the message about the node client, and the temporarily stored message is transmitted from the header client to the node client when the node client is reconnected, and
wherein one of the electronic apparatus and the at least one other electronic apparatus is selected as the header client based on one of a frequency in use of a network or whether one of the electronic apparatus and the at least one other electronic apparatus has a record of the header client.

9. The server of claim 8, wherein the server processor is further configured to receive information indicating that the header client in the client group is determined among the client group based on a user selection of the header client.

10. The server of claim 9, wherein the server processor is further configured to maintain a messaging channel with the header client and blocks a messaging channel with the node client when the header client is identified while the messaging channel with the node client is connected.

11. The server of claim 8,
wherein the server transceiver is connected to an application server providing an application, and
wherein the server processor is further configured to control the server transceiver to transmit the message received from the application server to the header client.

12. A control method of a system providing real-time messaging from a server to a client group through a messaging channel, the client group comprising an electronic apparatus and at least one other electronic apparatus, the control method comprising:
recognizing, by the electronic apparatus, that the electronic apparatus is a header client or a node client through communications among the client group including the at least one other electronic apparatus, wherein one apparatus among the client group broadcasts a message indicating a start of a process of selecting the header client to other apparatuses among the client group, receiving unique information from the other apparatuses, and selecting the electronic apparatus as the header client based on the unique information;
selecting one of the electronic apparatus and the at least one other electronic apparatus as the header client based on one of a frequency in use of a network or whether one of the electronic apparatus and the at least one other electronic apparatus has a record of the header client;
transmitting, by the electronic apparatus, information indicating that the electronic apparatus is the header client and the at least one other electronic apparatus is the at least one node client to the server;

transmitting, by the server, cluster identification information indicating that the electronic apparatus and the at least one other electronic apparatus are clustered within the client group;

establishing a push channel between the server and the header client;

using, by the server, when a message is destined for the at least one node client, the cluster identification information;

transmitting, by the server, the message to the header client through the messaging channel; and distributing, by the header client, the message received from the server to the at least one node client within the client group, wherein the header client temporarily stores the message in the header client when the node client is offline while the header client receives the message about the node client, and controls the header client to transmit the temporarily stored message to the node client when the node client is reconnected.

13. The control method of claim 12, wherein the determining of the header client comprises selecting, by one of the electronic apparatus and the at least one other electronic apparatus, the header client by a user input from the header client.

14. The control method of claim 12, wherein the determining of the header client comprises collecting, by one of the electronic apparatus and the at least one other electronic apparatus, battery residual value information from each client in the client group and selecting a client in the client group having the highest battery residual value of the client group as the header client.

15. The control method of claim 12, wherein the determining of the header client comprises determining, by one of the electronic apparatus and the at least one other electronic apparatus, network availability of each client in the client group.

16. The control method of claim 12, wherein the message from the server is transmitted from an application server providing an application to the server, and the clients are able to receive the message when the application is installed.

17. The control method of claim 12, wherein the determining of the header client comprises:
maintaining the messaging channel with the header client; and
blocking the messaging channel with the node client.

18. The control method of claim 12, wherein the determining of the header client comprises selecting, by one of the electronic apparatus and the at least one other electronic apparatus, a new header client when the existing header client in the client group is offline with respect to the server.

19. An electronic apparatus connected to a server providing real-time messaging through a messaging channel and to at least one other electronic apparatus, the electronic apparatus comprising:

a client transceiver configured to communicate with the server and the at least one other electronic apparatus, wherein the electronic apparatus and the at least one other electronic apparatus form a client group;

a client processor; and a client memory storing instructions, which when executed by the client processor, cause the client processor to:
recognize the electronic apparatus either as a header client or as a node client through communication within the client group including the at least one other electronic apparatus, wherein one electronic apparatus among the client group broadcasts a message indicating a start of a process of selecting the header client to other electronic apparatuses among the client group, receiving unique information from the other electronic apparatuses, and selecting the electronic apparatus as the header client based on the unique information, select one of the electronic apparatus and the at least one other electronic apparatus as the header client based on one of a frequency in use of a network or whether one of the electronic apparatus and the at least one other electronic apparatus has a record of the header client, in response to the electronic apparatus being recognized as the header client:
establish a push channel with the server,
transmit role information indicating that the electronic apparatus is the header client and the at least one other electronic apparatus is the at least one node client to the server,
receive cluster identification information from the server which assigns the cluster identification information indicating that the electronic apparatus and the at least one other electronic apparatus are clustered within the client group, and
control the client transceiver to transmit a message destined to the at least one node client to the at least one node client when the message is received from the server, the at least one node client being clustered with the header client within the client group indicated by the cluster identification information, wherein the client processor temporarily stores the message in the header client when the node client is offline while the header client receives the message about the node client, and controls the header client to transmit the temporarily stored message to the node client when the node client is reconnected.

* * * * *